United States Patent
Orten et al.

(10) Patent No.: US 7,250,206 B2
(45) Date of Patent: *Jul. 31, 2007

(54) WINDOW PANE CAPABLE OF BONDING WITH TEAR-AWAY CORD

(75) Inventors: Thomas Orten, Roetgen (DE); Thomas Bischof, Aachen (DE); Gerd Cornils, Merzenich (DE); Dietmar Kolf, Aachen (DE)

(73) Assignee: Saint-Gobain Glass France, Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 11/034,946

(22) Filed: Jan. 14, 2005

(65) Prior Publication Data

US 2005/0120647 A1  Jun. 9, 2005

Related U.S. Application Data

(63) Continuation of application No. 10/682,995, filed on Oct. 14, 2003, now Pat. No. 6,929,844, which is a continuation of application No. PCT/FR02/01248, filed on Apr. 10, 2002.

(30) Foreign Application Priority Data

Apr. 14, 2001 (DE) ................. 101 18 661

(51) Int. Cl.
  *B32B 3/00* (2006.01)
  *B60J 1/02* (2006.01)
  *E06B 3/00* (2006.01)
(52) U.S. Cl. ............... 428/172; 428/192; 296/90; 296/93; 296/96.12; 296/96.21; 52/204.597; 52/208

(58) Field of Classification Search ............... 428/34, 428/38, 172, 192; 52/208, 204.597; 296/84.1, 296/93, 96.21, 90, 96.12
See application file for complete search history.

(56) References Cited

U.S. PATENT DOCUMENTS

| | | | |
|---|---|---|---|
| 4,606,159 A | | 8/1986 | Kunert |
| 4,910,071 A | * | 3/1990 | Kunert ............ 428/192 |
| 4,933,032 A | * | 6/1990 | Kunert ............ 156/108 |
| 4,938,521 A | | 7/1990 | Kunert |
| 5,057,354 A | | 10/1991 | Kunert et al. |

(Continued)

FOREIGN PATENT DOCUMENTS

DE  673 951  3/1939

(Continued)

*Primary Examiner*—Donald J. Loney
(74) *Attorney, Agent, or Firm*—Oblon, Spivak, McClelland, Maier & Neustadt, P.C.

(57) ABSTRACT

A window pane (1), in particular an automobile window pane, is adhesively bonded to a frame (8) of a window opening by an adhesive bead (6), and carries a profiled bead (3) provided with a recess (4) extending longitudinally and a tear-away cord (8) laid therein. Tear-away cord (8) is designed for breaking the adhesive bond between window pane (1) and frame (7). A contact surface is provided for adhesive bead (6) alongside profiled bead (3). In the fitted state, recess (4) is open toward adhesive bead (6) so that the tear-away cord may be pulled without exerting a high force directly in the adhesive bead that abuts the opening of the recess.

17 Claims, 1 Drawing Sheet

U.S. PATENT DOCUMENTS

| | | |
|---|---|---|
| 5,069,012 A | 12/1991 | Riederer |
| 5,261,718 A | 11/1993 | Ohlenforst et al. |
| 6,929,844 B2 * | 8/2005 | Orten et al. ............... 428/172 |

FOREIGN PATENT DOCUMENTS

| | | |
|---|---|---|
| DE | 34 09 903 A1 | 10/1984 |
| DE | 33 32 232 A1 | 3/1985 |
| DE | 3 730 345 A1 | 3/1989 |
| DE | 196 13 259 C1 | 7/1997 |
| EP | 0 367 662 | 5/1990 |
| FR | 2 649 654 | 1/1991 |
| FR | 2 716 416 | 8/1995 |

* cited by examiner

WINDOW PANE CAPABLE OF BONDING WITH TEAR-AWAY CORD

CROSS-REFERENCE TO RELATED APPLICATIONS

This application is a continuation of the U.S. application Ser. No. 10/682,995 filed on Oct. 14, 2004, now U.S. Pat. No. 6,929,844 which is a continuation of the U.S. National Stage designation of International Patent Application PCT/FR02/01248, filed on Apr. 10, 2002, all of which are incorporated herein by reference in their entirety.

FIELD OF THE INVENTION

The invention relates to a window pane capable of being adhesively bonded and provided with a tear-away cord. The term "tear-away cord" denotes here in general also suitable wires and the like fulfilling the same role.

BACKGROUND OF THE INVENTION

An adhesively bonded vehicle window provided with a premounted tear-way away cord is known from DE-T2-689 11 272 (EP 0 367 662 B1). The tear-away cord is made of a very strong material. It is laid in a profiled bead of synthetic material which adheres directly to the surface of the window pane in question. The profiled bead basically serves as an adhesive bead that links the window pane in a nonreleasable manner to the flange of the frame. By pulling on the tear-away cord, the profiled bead may be separated along its length, which also indirectly breaks the bond between the adhesive bead (which continues to adhere to the frame) and the window pane. The actual window pane then can be removed from the frame without being destroyed.

Very special attention has been devoted to limiting the separating force that must possibly be exceeded by the tear-away cord. Premature breaking of the relatively thin cord by excessive stressing must be prevented. For this reason, in one embodiment of this prior art, the tear-away cord is laid in a longitudinal groove of the profiled bead which, if it is desired, subsequently may be filled with a synthetic material after laying the cord. The groove constitutes a reduction in the cross-section, namely a site for future tearing, as it defines the cross-section to be separated. In other embodiments, the width of the area of adhesion of the profiled bead to the window pane is limited by special separating layers.

Also known (from DE-A1-3 730 345) is another similar window pane in which an adhesive bead intended to bond the pane to a frame is also applied to a profiled bead of synthetic material that itself adheres to the surface of the pane. In the embodiment in FIG. 6 of that document, this profiled bead may include a groove which serves for laying a tear-away cord, the groove being open on the side of the surface of the pane that is not turned toward the side of the profiled bead and not oriented toward the adhesive bead. Consequently, if tensile forces act on the tear-away cord, the strength of the wall of the groove, located between the cord and the adhesive bead, together with not inconsiderable friction, must be overcome and then the cord must in practice be pulled transversely with respect to the opening of the groove, in order to make it leave the groove and make it penetrate the adhesive bead.

In such configurations, an essential condition of the operation of the arrangement of the adhesive on the profiled bead is good mutual adhesion of the two materials that may, for example, both be based on polyurethane.

In an earlier known form (DE-A1 3 332 232), the tear-away cord is laid in a channel closed by a decorative or sealing section that extends parallel to an adhesive bead along the edge of a window pane, but without any adhesive bond to the edge of the pane. At one point, this tear-away cord is forced toward the inside through the adhesive bead, where it forms a purchase point for applying the necessary separating forces.

Direct incorporation of such a tear-away cord into the adhesive bead also is known (DE-A1 3 409 903), for example by laying it down at the same time as the adhesive bead is being extruded for nonreleasably joining the window pane to the flange of the frame. Vulcanization of a tear-away cord in a rubber frame of a window pane is known from the patent DE-PS-673 951. In this case, the entire cross-section of the adhesive bead or of the sealing frame must be separated, and this may require considerable forces to be applied meaning that the tear-away cord has to have a high tensile strength.

SUMMARY OF THE INVENTION

Starting from the prior art mentioned above, the invention relates to another configuration of an adhesively bonded window frame provided with a tear-away cord.

Because the tear-away cord is laid in a recess or groove in the profiled bead, with the recess or groove being oriented and open (in the fitted state) toward the adhesive bead, it is unnecessary at the start to exert a force in order to separate or deform the relatively strong material of the profiled bead. That material serves as a spacer in order to obtain, during fitting, a defined thickness of the adhesive bead that adheres to the surface of the window on the profiled bead side. On the contrary, all applied force directly acts on the adhesive bead. Moreover, in this way it is unnecessary to lay the tear-away cord in the actual adhesive bead with relatively difficult implementation. Instead, a clear separation is obtained between forming the profiled bead, laying the tear-away cord in the pre-formed longitudinal recess, and applying the adhesive bead. In order to insert the tear-away cord into the recess or groove in the profiled bead, it is possible to use a special tool such as a guide tube provided with an insertion tip tailored to the cross-section of the recess. Whether the tear-away cord has been fitted in the correct position may be confirmed by a simple visual check, because the tear-away cord remains visible on the pane that has been pre-equipped but has not yet been fitted or covered with the adhesive bead. Should any laying error occur, the tear-away cord even may be easily extracted and re-laid. Reproducible work of high quality thus generally may be obtained.

In a manner known per se, the tear-away cord preferably is made of a very strong synthetic material (aramid fibers or the like) having a low intrinsic stiffness.

In principle, it does not matter whether the adhesive bead is closer to the outer edge of the pane than the profiled bead, or vise versa. However, the latter embodiment is preferred because the tear-away cord and its purchase point must instead be accessible from the interior of the vehicle.

It is not absolutely necessary to make the tear-away cord pass through the adhesive bead fundamentally at at least one place, because it is also possible to conceive of other means of applying, when necessary, separating forces to the tear-away cord. For example, this could be a local partial splitting of the adhesive bead at a possibly marked place by means of an appropriate tool, in order thereafter to grip the tear-away cord. However, it is preferable to make the actual tear-away cord, or a purchase point that is fixedly attached thereto, pass through the adhesive bead in order to allow the tear-away cord to be rapidly actuated by hand.

In one advantageous embodiment, the materials of the profiled bead and the adhesive bead are matched to each other in such a way that the adhesive does not adhere to the profiled bead. Thus, the adhesive preferably is based on polyurethane (PU), for example preferably a one-component PU curing by the moisture in the air. It is also possible to use modified-silane-based moisture-curing polymers (MS polymers). The profiled bead is made, in a manner known per se, of a thermoplastic elastomer (TPE) that does not form an adhesive bond with the adhesive. The generic term "TPE" encompasses, for example, as groups of materials, TPE-S (SBS, SEBS), TPE-O, TPE-U, TPE-V and TPE-A. Reference is made to the German book "Römpp Lexikon Chemie", 10th edition, pages 4506 and 4507, for examples of this. Polypropylenes or polyethylenes also could be used as materials for the profiled bead.

Provision also may be made for the profiled bead to pass beneath parts of the adhesive bead and thus limit the width of the adherent base of the adhesive to the surface of the pane, that is to say toward the outer edge of the window pane. It is then clear to make the tear-away cord pass through the smallest cross-section of the adhesive bead. This result preferably is obtained with the surface of part of the profiled bead, passing beneath the adhesive bead, being extended in the recess housing the tear-away cord. Thus formed in the region of adhesionless contact between the adhesive and the profiled bead is a kind of ramp by which the tear-away cord may be taken, without any great resistance, directly into the region of adhesion of the adhesive to the surface of the pane. Even when this width of the adhesion base is controlled, it is necessary to ensure that there is a sufficient holding force and sufficient sealing of the fitted window pane.

The recess provided for the tear-away cord may easily be cut as a reverse taper in such a way that the cord can immediately be fitted after formation of the profiled bead and without any risk of it dropping.

In a manner known per se, the profiled bead may be provided laterally with lips and/or with a slot-covering profile that extends beyond the edge of the pane, or possibly it may be produced as a single piece with the latter. Such appendices supplement the spacing function of the profiled bead with the functions of an alignment accessory, during (automated) fitting of the window pane, and of complete covering of a residual gap between the edge of the pane and the fixed frame.

It is clear that the tear-away cord must not surround the entire periphery of the window frame, and that it must extend only over a distance that corresponds to that of the profiled bead and of the parallel adhesive bead when these do not cover the entire perimeter of the pane. For example, this could be the case with a removable vehicle window that, in a known manner, can be bonded only to one side or to both sides, with the adhesive providing at the same time an articulation or hinge function.

BRIEF DESCRIPTION OF THE DRAWINGS

Preferred features of the present invention are disclosed in the accompanying drawings, wherein similar reference characters denote similar elements throughout the several views, and wherein.

DETAILED DESCRIPTION OF PREFERRED EMBODIMENTS

Figure 1:
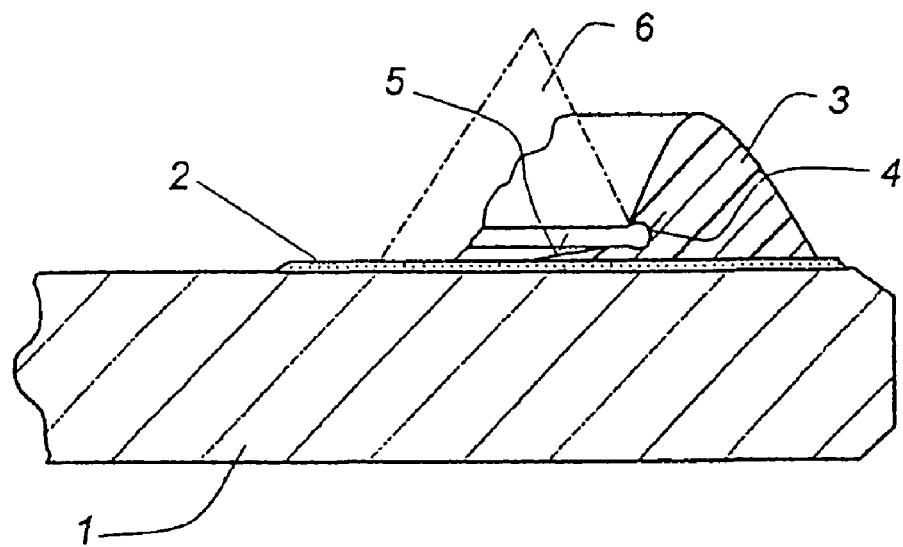
FIG. 1 shows a cross-section through the region of the border of a window pane with a profiled bead that adheres thereto and a recess that is formed therein.

In FIG. 1, a window pane 1 made of glass or synthetic material is provided on its surface, along its upper edge, with an opaque border strip 2 that for example may be baked onto the surface of the glass. A profiled bead 3, preferably made of a thermoplastic elastomer, adheres to this glass, near the edge of the pane. The profiled bead may be formed, for example, by extrusion or by in situ direct injection molding on the surface of the pane, or it may be adhesively bonded to the pane as a prefabricated profiled portion. According to the invention, an open recess 4 is formed in the sidewall of profiled bead 3 that does not face the edge of the pane, said recess 4 extending along the profiled bead. Finally, the profiled bead 3 also includes a part 5 that is flattened or (as shown) is in the form of a bevel that extends to the surface of the pane or over the border strip 2 going away from the edge of the pane. Its free surface is joined to the opening of recess 4. Next, before the window pane is fitted, an adhesive bead 6 (shown here only in dot-dash lines) is applied to a contact surface, also located on the opaque border strip 2, beside and parallel to profiled bead 3. To improve the adhesion between profiled bead 3 and adhesive bead 6, on the one hand, and with window pane 1, on the other hand, the border strip 2 may be covered in a known manner with a base layer or with an adhesion promoter. The latter furthermore prevents both a direct view onto the adhesive bead and its degradation by UV radiation.

Figure 2:
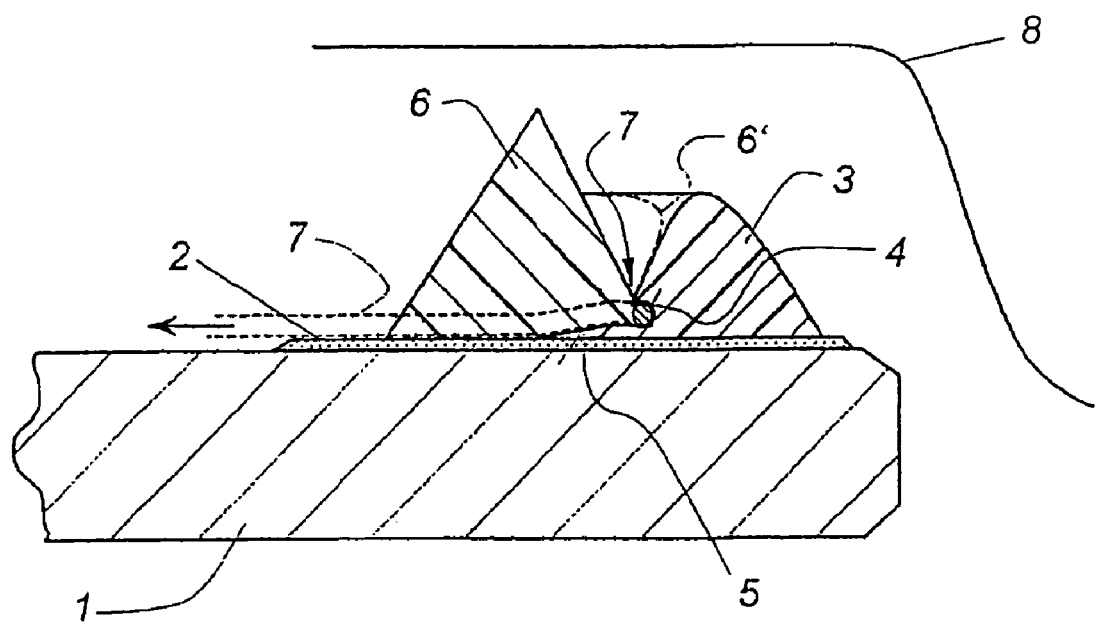
FIG. 2 shows the cross-section of FIG. 1 after a tear-away cord has been laid in the recess of the profiled bead and after an adhesive bead has been applied parallel to the profiled bead.

A subsequent manufacturing and production stage is shown in FIG. 2. Before adhesive bead 6 is applied, or at the same time as application, a tear-away cord 7 is laid along the length of profiled bead 3, in a recess 4 in the latter. The recess 4 may be easily cut as a reverse taper. Although tear-away cord 7 is therefore incorporated therein almost in shape correspondence, it may be extracted therefrom by exerting only a small force. In addition, as shown by the thin line, it may be removed transversely from adhesive bead 6 at least at one point in order to provide an accessory for applying tensile forces (indicated by an arrow) or to permit connection to such an accessory. Here, the accessory is located in the internal space bounded by the window pane. It may for example be formed from a peripheral bead that must then, of course, pass twice through the adhesive. In the passage region, the tear-away cord is in practice laid on the contact surface between adhesive bead 6 and window pane 1.

In the fitted state, adhesive bead 6 will form a direct adhesive bond between window pane 1 and a frame 8 or a flange of a window opening, these merely being sketched in. The window pane 1 therefore may be bonded in the frame of a window opening of a vehicle body, practically flush with the surfaces, with the profiled bead 3 (possibly supported by an elastically deformable lip, not shown here, that forms an outer lateral collar) serving as an auxiliary for positioning and for alignment.

Outside its surface of contact with border strip 2, the adhesive bead also covers part 5 of the profiled bead and, preferably, although not being absolutely necessary, the opening of recess 4 that is formed in the sidewall of profiled bead 3 adjacent to adhesive bead 6. By appropriately selecting the materials, any adhesion may be chosen between tear-away cord 7 and the walls of recess 4, and between adhesive bead 6 and tear-away cord 7, on the one hand, and between adhesive bead 6 and profiled bead 3, on the other hand. It is also possible to provide, optionally, a local covering by a separating agent. Likewise, there is no adhesion in the region of contact between adhesive 6 and part 5 of profiled bead 3, and between profiled bead 3 and frame 8. By superposing the adhesive bead 6 and the flattened or bevel-shaped part 5 of the profiled bead, the width of bonding to the surface of the pane is defined in a controlled manner, to avoid overstressing the tear-away cord. Preferably, this bonding width will be from 6 to 10 mm.

In the fitted state, or while fitting window pane 1, the adhesive bead 6 is plastically deformed toward profiled bead 3 until the tip of profiled bead 3 comes up against frame 8 and thus follows the sidewalls of the profiled bead without adhering thereto. Its state of deformation is indicated by a dotted line 6'. The recess 4 is completely covered, and the adhesive at least partly may penetrate therein. Also, there is no adhesion between the fitted tear-away cord 7 and adhesive bead 6.

It is apparent from the two figures that the recess 4 is placed in an obtuse-angled channel located between part 5 and the sidewall of profiled bead 3 that extends in a direction away from the surface of the pane. The separating joint between said sidewall and profiled bead 6 increases in opposition to the desired direction of movement of tear-away cord 7. During its extraction from recess 4 in the direction of the arrow, the tear-away cord therefore finds in practice, in the joint separating part 5 from adhesive bead 6 in the direction of least resistance, a ramp on which it can slide or be guided directly over the contact surface between adhesive bead 6 and window pane 1 or its border strip 2. When pulling continues, it thus separates the adhesive bead 6 over the entire periphery, in each case to the extent that allows the window pane to be removed without destroying it. In the ideal case, only small residues of the adhesive bead continue to adhere to window pane 1 or border strip 2.

What is claimed is:

1. A glazing comprising:
  a pane having an outer edge;
  a profiled bead coupled to a surface of said pane, said profiled bead having a base, an outer inclination, and an inner inclination comprising a recess and a ramp; and
  a tear-away cord;
  wherein the outer inclination is proximate to the outer edge of the pane and the inner inclination is opposite thereto;
  wherein said ramp is coupled to the surface of said pane and extends from and is proximate to the recess; and
  wherein the tear-away cord contacts said recess.

2. The glazing of claim 1, wherein said profiled bead is disposed proximate the outer edge of said pane.

3. The glazing of claim 1, wherein said pane comprises glass.

4. The glazing of claim 1, further comprising a border strip disposed between the base of said profiled bead and said pane.

5. The glazing of claim 1, wherein said profiled bead comprises an extruded polymer.

6. The glazing of claim 1, wherein said profiled bead comprises an injection molded polymer.

7. The glazing of claim 1, wherein said profiled bead is formed in situ by extrusion or injection molding onto said pane.

8. The glazing of claim 1, wherein said profiled bead is prefabricated and adhesively bonded to said pane.

9. The glazing of claim 1, wherein said profiled bead comprises a thermoplastic elastomer.

10. The glazing of claim 1, wherein said recess comprises a reverse taper.

11. The glazing of claim 1, wherein said profiled bead further comprises a lip.

12. The glazing of claim 1, wherein said ramp is disposed at an obtuse angle with respect to an adjacent portion of said profiled bead.

13. The glazing of claim 1, wherein said profiled bead comprises a slot-covering profile that extends beyond the edge of said pane.

14. The glazing of claim 4, wherein said border strip is covered with a base layer or with an adhesion promoter.

15. An automobile comprising said glazing as claimed in claim 1.

16. The glazing of claim 1, wherein said profiled bead has only one recess.

17. The glazing of claim 1, wherein a portion of a longitudinal cross-section of said profiled bead is dromedarian-shaped.

* * * * *